(12) United States Patent
Qi et al.

(10) Patent No.: US 12,172,295 B2
(45) Date of Patent: Dec. 24, 2024

(54) TACTILE SENSOR CAPABLE OF ACCURATELY DETECTING CONTACT POINTS OF AN OBJECT AND A MANIPULATOR

(71) Applicant: WEIHAI HUALING OPTO-ELECTRONICS CO., LTD., Shandong (CN)

(72) Inventors: Wuchang Qi, Shandong (CN); Masahiro Yokomichi, Hyogo Prefecture (JP)

(73) Assignee: WEIHAI HUALING OPTO-ELECTRONICS CO., LTD., Shandong (CN)

( * ) Notice: Subject to any disclaimer, the term of this patent is extended or adjusted under 35 U.S.C. 154(b) by 140 days.

(21) Appl. No.: 17/802,146

(22) PCT Filed: May 31, 2021

(86) PCT No.: PCT/CN2021/097426
§ 371 (c)(1),
(2) Date: Aug. 25, 2022

(87) PCT Pub. No.: WO2022/001547
PCT Pub. Date: Jan. 6, 2022

(65) Prior Publication Data
US 2023/0103779 A1    Apr. 6, 2023

(30) Foreign Application Priority Data
Jun. 28, 2020    (CN) .......................... 202010599981.1

(51) Int. Cl.
*B25J 13/08*    (2006.01)
*G01L 5/22*    (2006.01)

(52) U.S. Cl.
CPC ........... *B25J 13/084* (2013.01); *B25J 13/082* (2013.01); *G01L 5/228* (2013.01)

(58) Field of Classification Search
CPC ....... B25J 13/084; B25J 13/082; G01L 5/228; G06F 3/0414; G06F 3/0412
See application file for complete search history.

(56) References Cited

U.S. PATENT DOCUMENTS

| 6,007,728 A | 12/1999 | Liu et al. |
| 11,642,796 B2 * | 5/2023 | Keraly .................... B25J 15/08 700/258 |

(Continued)

FOREIGN PATENT DOCUMENTS

| CN | 1539604 A | 10/2004 |
| CN | 1726453 A | 1/2006 |

(Continued)

OTHER PUBLICATIONS

The extended European search report of the corresponding EP patent application No. 21834225.1, mail date Aug. 9, 2023.

*Primary Examiner* — Octavia Hollington
(74) *Attorney, Agent, or Firm* — Samson G. Yu

(57) ABSTRACT

A tactile sensor, including: a contact part (1), configured to receive pressure transmitted when a manipulator grabs a target object, and transmit the pressure to a sensing part (2); the sensing part (2), located on one side of the contact part, the sensing part (2) moving in a direction away from the contact part (1) under an action of the pressure; and a detection part (4), located on a side of the sensing part (2) away from the contact part (1), the detection part (4) sensing a position change of the sensing part (2) to generate a sensing signal, wherein the sensing signal is configured to determine a contact parameter between the manipulator and the target object.

18 Claims, 3 Drawing Sheets

(56) References Cited

U.S. PATENT DOCUMENTS

| | | | |
|---|---|---|---|
| 2014/0174204 A1 | 6/2014 | Chen et al. | |
| 2016/0328079 A1* | 11/2016 | Schwartz | ............. G06F 3/0447 |
| 2017/0203440 A1 | 7/2017 | Koselka et al. | |

FOREIGN PATENT DOCUMENTS

| | | | | |
|---|---|---|---|---|
| CN | 102539022 A | * | 7/2012 | ............ B25J 13/085 |
| CN | 105320346 A | * | 2/2016 | ......... G02F 1/13338 |
| CN | 107655498 A | | 2/2018 | |
| CN | 109163824 A | | 1/2019 | |
| CN | 110216717 A | | 9/2019 | |
| CN | 110328660 A | | 10/2019 | |
| CN | 111015740 A | | 4/2020 | |
| CN | 111168723 A | | 5/2020 | |
| CN | 111618912 A | | 9/2020 | |
| CN | 212666113 U | | 3/2021 | |
| CN | 219064736 U | * | 5/2023 | |
| JP | H085482 A | | 1/1996 | |
| JP | 5089774 B2 | * | 12/2012 | ............ B25J 13/084 |
| JP | 2017116317 A | * | 6/2017 | |
| JP | 6235747 B1 | * | 11/2017 | .............. G01L 1/26 |
| JP | 2018054446 A | | 4/2018 | |
| KR | 20140074461 A | | 6/2014 | |
| WO | 2018012329 A1 | | 1/2018 | |
| WO | WO-2018049070 A1 | * | 3/2018 | ............ G01L 1/146 |
| WO | WO-2018163623 A1 | * | 9/2018 | ............ G01L 1/146 |

\* cited by examiner

TACTILE SENSOR CAPABLE OF ACCURATELY DETECTING CONTACT POINTS OF AN OBJECT AND A MANIPULATOR

CROSS-REFERENCE TO RELATED APPLICATION

This application claims priority to China Patent Application No. 202010599981.1, filed on Jun. 28, 2020 in China National Intellectual Property Administration and entitled "Tactile Sensor", which is hereby incorporated by reference in its entirety.

TECHNICAL FIELD

The present invention relates to a technical field of sensors, specifically to a tactile sensor.

BACKGROUND

In the related art, a manipulator is an automatic operation device that can imitate certain action functions of human hands and arms, and grabs and transports objects or operates tools according to fixed procedures. The manipulator can replace the heavy labor of people to achieve mechanization and automation of production. Furthermore, the manipulator can also be operated in harmful environments to protect personal safety, so the manipulator is widely used in machine manufacturing, metallurgy, electronics, light industry and atomic energy departments and other departments. In the grabbing process, the manipulator needs to sense a contact point between the manipulator and an object to be grabbed as well as a magnitude of a grabbing force (i.e., the tactile sense and the force sense) at the contact point.

At present, most of contact sensors commonly used in the manipulator are pressure sensors. The pressure sensor has no tactile sense and force sense feedbacks, so the flexibility is greatly affected, resulting in a significant decrease in the grabbing accuracy of objects, often causing the grabbing action to be tilted and making the objects drop. In addition, the current pressure sensor usually uses a single-point pressure sensor. For example, sensor arrays are used in joints of the manipulator. Parameters of contact points are measured by an arraying method. However, in this method, although arrayed pressure sensors are used, due to a very small space in the manipulator and the limited number of pressure sensors in the array, positions of contact points cannot be accurately sensed, which cannot meet the requirements of the manipulator for grabbing fine objects.

In view of the above-mentioned problems, no effective solutions have yet been proposed.

SUMMARY

An embodiment of the present invention provides a tactile sensor to at least solve the following technical problem in the related art: a manipulator adopting a pressure sensor cannot accurately sense contact points of the manipulator and an object, resulting in a significant decrease in accuracy of grabbing an object.

According to one aspect of the embodiment of the present invention, a tactile sensor is provided, which is applied to a manipulator and includes: a contact part, configured to receive pressure transmitted when a manipulator grabs a target object, and transmit the pressure to a sensing part; the sensing part, located on one side of the contact part, the sensing part moving in a direction away from the contact part under an action of the pressure; and a detection part, located on a side of the sensing part away from the contact part, the detection part sensing a position change of the sensing part to generate a sensing signal, wherein the sensing signal is configured to determine a contact parameter between the manipulator and the target object.

Optionally, the tactile sensor further includes: an elastic part, located on one side of the contact part, and the sensing part is located between the contact part and the elastic part.

Optionally, the sensing part includes: a sensing electrode.

Optionally, the detection part includes: a detection base plate; and a sensor chip, located on the detection base plate; the sensing electrode has a projection on the sensor chip; and the sensor chip is electrically connected to the detection base plate through a bonding wire.

Optionally, the detection base plate includes: an electrical interface, connected to external equipment and configured to provide an electrical control signal to the detection base plate and transmit the sensing signal to outside.

Optionally, the sensor chip includes: a plurality of detection electrodes, configured to form an electric field together with the sensing electrode, wherein each detection electrode has the same arrangement direction as that of the sensing electrode.

Optionally, the sensor chip further includes: an electrical connection electrode, configured to provide a working voltage and a driving signal to the sensor chip, wherein the driving signal includes at least one of the following: a clock signal CLK, a row driving signal SI and an output signal SIG.

Optionally, the detection part further includes: a frame body, configured to be provided with an accommodating cavity and an opening, the detection base plate and the sensor chip being located inside the accommodating cavity; and a protection structure, configured to be enclosed with the frame body to form a sealed space.

Optionally, the protection structure is one of a protection cover plate and an encapsulation adhesive.

Optionally, the contact part is made of a flexible material, and the elastic part is made of a rubber material.

In the embodiment of the present invention, the contact part receives pressure transmitted when the manipulator grabs a target object, and transmits the pressure to a sensing part, the sensing part moves in the direction away from the contact part under the action of the pressure; and the detection part senses a position change of the foregoing sensing part to generate the sensing signal. The sensing signal is used for determining the contact parameter between the manipulator and the target object. In the embodiment, a tactile sensor capable of accurately detecting contact points of an object and a manipulator is provided, which outputs and feeds back sensed pressure to the outside in the form of a sensing signal, thus continuously monitoring a grabbing state of the manipulator; the contact points when the manipulator grabs an object are adjusted to improve the accuracy of grabbing an object, so that the following technical problem in the related art is solved: the manipulator adopting a pressure sensor cannot accurately sense contact points of the manipulator and an object, resulting in a significant decrease in the accuracy of grabbing the object.

BRIEF DESCRIPTION OF THE DRAWINGS

Drawings described herein are used for providing further understandings of the present invention, and constitute one part of this application. Illustrative embodiments

DETAILED DESCRIPTION OF THE EMBODIMENTS

In order to make those skilled in the art better understand the solutions of the present invention, the technical solutions in the embodiments of the present invention will be described clearly and completely below in combination with the drawings in the embodiments of the present invention. Obviously, the embodiments described herein are only part of the embodiments of the present invention, not all the embodiments. Based on the embodiments in the present invention, all other embodiments obtained by those of ordinary skill in the art without creative work shall fall within the protection scope of the present invention.

It should be noted that the terms "first", "second" and the like in the descriptions and claims of the present invention and the above drawings are configured to distinguish similar objects, and do not have to be configured to describe a specific order or sequence. It should be understood that data used in this way is interchangeable under appropriate circumstances so that the embodiments of the present invention described herein can be implemented in an order other than those illustrated or described herein. In addition, the terms "include" and "have" as well as any of their variations are intended to cover non-exclusive inclusions. For example, processes, methods, systems, products, or devices that include a series of steps or units are not necessarily limited to those steps or units clearly listed below, but may include other steps or units that are not clearly listed or are inherent to these processes, methods, products, or devices.

All the following embodiments of the present invention can be applied to various manipulators. A new tactile sensor is provided on a manipulator. Different tactile pressures act on a contact part and an elastic part, so that a sensing electrode in a sensing part generates different displacements; at the same time, different numbers of charges are generated on a detection electrode, thus outputting different sensing signals; and a manipulator of a contact force and positions of contact points can be calculated according to a magnitude of an output signal and an output waveform of the signal.

Figure 1:
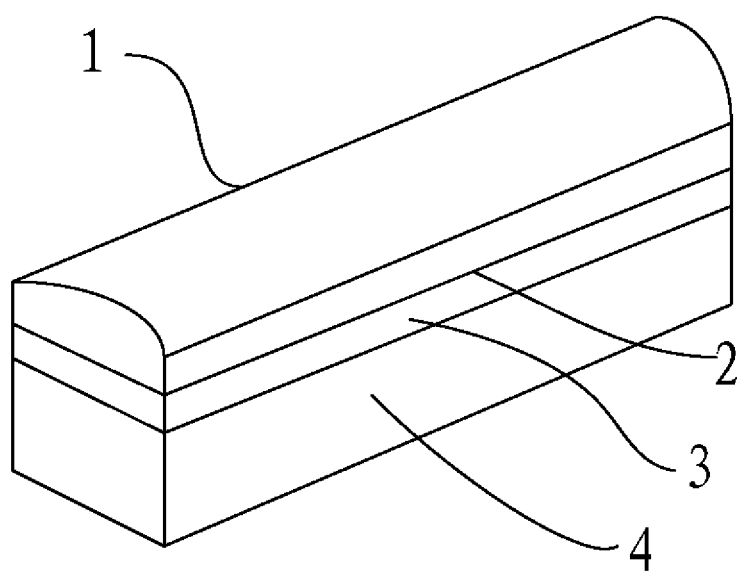
FIG. 1 is a schematic diagram of an appearance of an optional tactile sensor according to an embodiment of the present invention.

FIG. 1 is a schematic diagram of an appearance of an optional tactile sensor according to an embodiment of the present invention. The tactile sensor is applied to a manipulator. As shown in FIG. 1, the tactile sensor includes a contact part 1, a sensing part 2 and a detection part 4.

The contact part 1 receives pressure transmitted when the manipulator grabs a target object, and transmits the pressure to the sensing part.

The above-mentioned contact part 1 may be in contact with an external object to be grabbed, receives an external contact pressure, and transmits the pressure to the sensing part 2 and the elastic part 3.

The sensing part 2 is located on one side of the contact part. The sensing part moves along a direction away from the contact part under an action of the pressure.

Optionally, the sensing part includes: a sensing electrode. The sensing electrode may be configured as a flat sheet-like electrode, which is configured to generate a corresponding deformation according to a magnitude of acting force when the target object is in contact with the manipulator.

In FIG. 1, the tactile sensor further includes: an elastic part 3, which is located on one side of the contact part, and the sensing part is located between the contact part and the elastic part.

As an optional embodiment of the present invention, the contact part may be made of a flexible material, and the elastic part may be made of a rubber material.

The elastic part 3 receives the external pressure transmitted by the contact part 1 to drive the sensing electrode to generate a corresponding deformation, so that a distance D between the sensing electrode and the detection part 4 changes with the external force.

The above-mentioned sensing electrode may carry basic voltage to form an electric field together with a detection electrode (which is arranged in the detection part), and charges are formed on the detection electrode. The sensing electrode is located between the contact part 1 and the elastic part 3, and may generate a corresponding deformation with the deformation of the contact part 1 and the elastic part 3. When there is external force acting on the contact part 1 (for example, when the manipulator grabs the target object), the acting force of the contact with the target object is transmitted to the inside through the contact part 1, so that the sensing electrode and the elastic part 3 generate corresponding deformations with the acting force. After the sensing electrode deforms, the distance D between the sensing electrode and a surface of the detection part 4 will change. If the contact force is higher, the sensing electrode 2 deforms more greatly, the value of D becomes smaller, and the sensing electrode is closer to the detection part 4. Different positions of the contact points indicate different positions where D changes. Therefore, the magnitude of the pressure and the position of an acting point can be measured, that is, the positions of the contact points and the magnitude of the contact force are determined.

The basic voltage carried by the sensing electrode may be pre-applied. The basic voltage can be supplied by the detection part 4 or can be directly supplied as required. A voltage value of the basic voltage is one of key parameters of the entire tactile sensor. The voltage value is related to the flexibilities and thicknesses of the contact part 1 and the elastic part 3, and is also related to the initial distance D between the sensing electrode and the detection part 4. That is, the voltage value is related to a use environment of the tactile sensor, i.e., an upper limit design value of an initial weight of the target object. If the weight of an object to be grabbed is large, the contact part 1 and the elastic part 3 need to have low flexibility and large thickness, and the distance between the sensing electrode and the detection part 4 is long. At this time, a voltage applied to the detection electrode 2 is high. On the contrary, the voltage applied is low.

Figure 2:
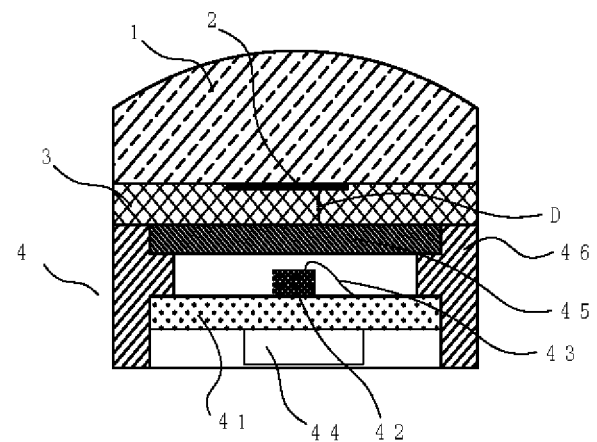
FIG. 2 is a schematic diagram of a sectional structure of an optional tactile sensor according to an embodiment of the present invention.

FIG. 2 is a schematic diagram of a sectional structure of an optional tactile sensor according to an embodiment of the present invention. As shown in FIG. 2, the tactile sensor includes a contact part 1, a sensing part 2 (which can be understood as a sensing electrode), a detection part 3 and a detection part 4.

The detection part 4 is located on one side of the sensing part away from the contact part. The detection part generates a sensing signal by means of sensing a change in a position of the foregoing sensing part. The sensing signal is configured to determine a contact parameter between the manipulator and a target object.

In the embodiment of the present invention, the detection part 4 includes: a detection base plate; and a sensor chip, which is located on the detection base plate; the sensing electrode has a projection on the sensor chip; and the sensor chip is electrically connected to the detection base plate through a bonding wire.

By means of the detection part 4, a change in charges generated by the sensing electrode 2 on the corresponding detection electrode due to the position change caused by the deformation.

As shown in FIG. 2, the detection part 4 includes: a detection base 41, a sensor chip 42 and a bonding wire 43.

Optionally, the detection base plate includes: an electrical interface, connected to external equipment and is configured to provide an electrical control signal to the detection base plate and transmit the sensing signal to outside. As shown in FIG. 2, the electrical interface is 44.

The sensor chip 42 is carried on the detection base plate 41. Detection electrodes 421 are arranged on the sensor chip 42. The detection electrodes 421 are linearly arranged on a surface of the chip. The sensor chip may be a charge sensing sensor chip.

The sensor chip on the detection part 4 includes: the detection electrodes 421 and electrical connection electrodes 422.

Figure 3:
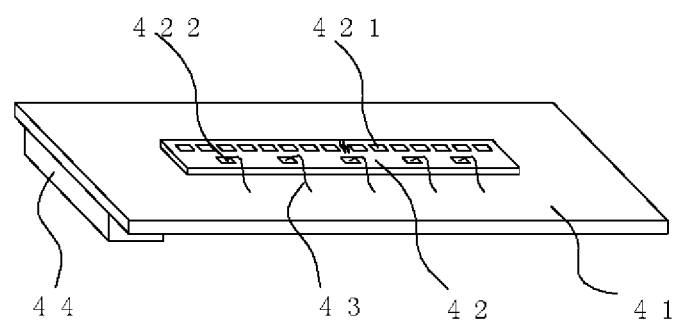
FIG. 3 is a schematic diagram of an optional detection base plate according to an embodiment of the present invention.

FIG. 3 is a schematic diagram of an optional detection base plate according to an embodiment of the present invention. As shown in FIG. 3, the detection base plate is provided with a sensor chip, and the sensor chip includes detection electrodes 421 and electrical connection electrodes 422. The sensor chip 42 is electrically connected to the detection base plate 41 through bonding wires 43. The detection base plate 41 is also provided with an electrical interface 44 for external connection. An electrical control signal is provided for the detection base plate 41 through the electrical interface 44, and a detected sensing signal is output to the outside.

Figure 4:
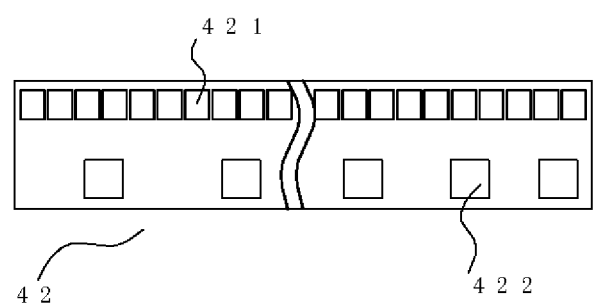
FIG. 4 is a schematic diagram of a sensor chip according to an embodiment of the present invention.

FIG. 4 is a schematic diagram of an optional detection base plate according to an embodiment of the present invention. As shown in FIG. 4, the sensor chip 42 is provided with a plurality of detection electrodes 421 and electrical connection electrodes 422 which are arranged in parallel.

The detection electrodes 421 form an electric field together with sensing electrodes. Each detection electrode has the same arrangement direction as the sensing electrode. The sensing electrodes and the detection electrodes 421 are arranged along the same direction, and the sensing electrodes may be arranged right above the detection electrodes 421. A voltage applied to the sensing electrodes and the detection electrodes 421 form an electric field, and sensing charges are generated on the detection electrodes 421. In this way, the sensor chip 42 can convert a charge signal generated on the detection electrodes 421 into a voltage signal to obtain a sensing signal, and the sensing signal is output to the outside. The detection electrode 421 is a planar metal electrode manufactured by a semiconductor process. Materials used in the manufacturing include an aluminum material. The detection electrode 421 is connected to a shift circuit inside an integrated circuit (IC) through a conventional logic switch, and is converted into a series signal output to the outside.

The electrical connection electrodes 422 provide a working voltage and a driving signal to the sensor chip. The driving signal includes at least one of the following: a clock signal CLK, a row driving signal SI and an output signal SIG. The driving signal is not limited to the foregoing clock signal CLK and the row driving signal SI.

Figure 5:
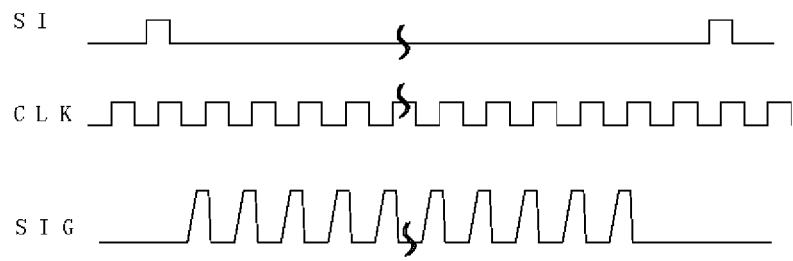
FIG. 5 is a schematic diagram of an output signal of an optional electrical connection electrode according to an embodiment of the present invention.

FIG. 5 is a schematic diagram of an output signal of an optional electrical connection electrode according to an embodiment of the present invention. As shown in FIG. 5, under the driving of the clock signal, the sensor chip will carry out row scanning once every row driving signal SI (positive pulse) is output, and outputs a row of voltage signals corresponding to each detection electrode 421. In a continuous working state, the tactile sensor can output the sensing signals to the outside in real time. After receiving the sensing signals, a control system/control console converts the sensing signals into pressure and position signals, so as to continuously monitor a working state of the manipulator.

The sensor chip 42 arranged on the detection base plate 41 in FIG. 4 can be selected randomly. The sensor chip is a chip (unencapsulated bare chip) manufactured by a Complementary Metal-Oxide-Semiconductor Transistor (CMOS) process. The detection electrodes 421 and the electrical connection electrodes 422 are arranged on a surface of the chip. The detection electrodes 421 are uniformly arranged along a lengthwise direction of the chip, and a size of each detection electrode 421 may be set according to a required resolution.

Optionally, the detection part further includes: a frame body, configured to be provided with an accommodating cavity and an opening, the detection base plate and the sensor chip being located inside the accommodating cavity; and a protection structure, configured to be enclosed with the frame body to form a sealed space.

In the embodiment of the present invention, the protection structure is one of a protection cover plate and an encapsulation adhesive. As shown in FIG. 2, the protection cover plate is 45, and the frame body is 46. The detection base plate 41 is mounted inside the frame body 46, and the protection cover plate 45 may be mounted on an upper surface of the frame body 46 and is configured to protect the sensor chip 42.

In FIG. 2, D between the sensing part 2 and the protection cover plate 45 indicates a distance between the sensing electrode and a surface of the detection part.

In the tactile sensor, the contact part 1 can receive pressure transmitted when the manipulator grabs the target object, and transmits the pressure to the sensing part; the sensing part 2 moves in the direction away from the contact part under the action of the pressure; and the detection part 4 senses a position change of the foregoing sensing part 2 to generate the sensing signal. The sensing signal is used for determining the contact parameter between the manipulator and the target object. In the embodiment, a tactile sensor capable of accurately detecting contact points of an object and a manipulator is provided, which outputs and feeds back sensed pressure to the outside in the form of a sensing signal, thus continuously monitoring a grabbing state of the manipulator; the contact points when the manipulator grabs an object are adjusted to improve the accuracy of grabbing an object, so that the following technical problem in the related art is solved: the manipulator adopting a pressure sensor cannot accurately sense contact points of the manipulator and an object, resulting in a significant decrease in the accuracy of grabbing the object.

The sensor chip 42 in a continuous working state will output signals to the outside in real time (even if the sensor chip is in no contact with an external object). Therefore, sensed pressure can be output and fed back to the outside in the form of a voltage signal, and the control system can continuously monitor the grabbing state of the manipulator.

In the embodiment of the present invention, the direction of the sensing electrodes may be set to be the same as the arrangement direction of the detection electrodes 421; furthermore, the sensing electrodes are arranged right above the detection electrodes 421; and a plane where the sensing electrodes are located is parallel to a plane where the detection electrodes 421 are located. A structure of a plate capacitor is formed between the sensing electrodes and the detection electrodes 421. According to the principle of the plate capacitor: $C=q/V$, C is the capacity of a capacitor; q is a charge value sensed on the detection electrode; and V is a basic voltage applied to the sensing electrode. According to the structure of the plate capacitor, the capacity of the container can also be expressed as: $C=\varepsilon S/D$, where C is the capacity of the container; $\varepsilon$ is the dielectric constant of a medium between plates; S is an area of each detection electrode 421, and D is the distance between the sensing electrodes and the detection electrodes 421. Therefore, a sensed charge value on the detection electrodes can be calculated: $q=\varepsilon S*V/D$.

The quantity of charges sensed on the detection electrodes 421 are mainly determined by the basic voltage V applied to the sensing electrodes and the distance D between the sensing electrodes and the detection electrodes 421. The quantity of charges is in direct proportion to the basic voltage applied. A higher basic voltage V indicates more sensed charges. The quantity of charges is in inversely proportional to the distance D. A shorter distance D indicates more sensed charges.

The embodiment of the present invention mainly aims to grab a lighter object. The elastic part 3 and the contact part 1 are relatively thin. For example, the elastic part has a thickness of 2 mm and is made of a rubber material. The contact part 1 has a thickness of 5 mm and is also made of a rubber material. During selection of the material of the sensing electrodes, different materials are selected according to the weights of objects needing to be grabbed by all the manipulators. For example, a copper foil that has a thickness of 0.03 mm and a width of 2 mm is used as the sensing electrode. The copper foil is fixedly adhered between the contact part 1 and the elastic part 2.

The intensity of the sensing signal output by the tactile sensor is converted into the magnitude of contact force, and a position of an acting point can be obtained according to an output value of each detection electrode indicated by an output waveform.

In a scenario where a heavy object needs to be grabbed, the contact part 1 and the elastic part 3 may be thickened, and their flexibilities may be reduced. In this way, the distance between the sensing electrodes and the detection part 4 will be prolonged, so that the tactile sensor can bear higher acting force. After the distance between the sensing electrodes and the detection part 4 is prolonged, charges sensed on the detection electrodes 421 will decrease, and the sensitivity to the acting force will decrease. At this time, the intensity of the output signal can be improved by increasing the voltage on the sensing electrodes.

Figure 6:
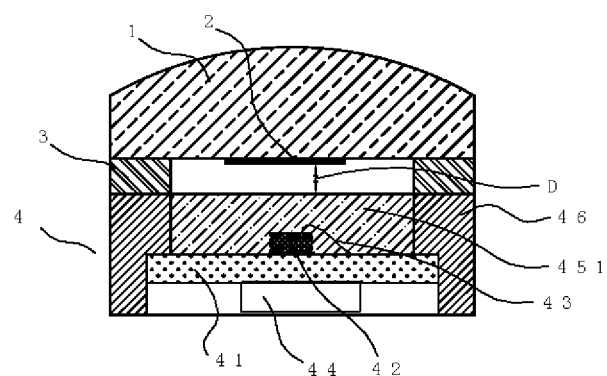
FIG. 6 is a schematic diagram of another optional tactile sensor according to an embodiment of the present invention.

FIG. 6 is a schematic diagram of another optional tactile sensor according to an embodiment of the present invention. As shown in FIG. 6, an encapsulation layer 451 is used to protect the sensor chip, which replaces the protection cover plate mounted at the upper part of the chip. The encapsulation layer 451 can be formed by smearing an encapsulation adhesive. By the use of the encapsulation adhesive, a distance between a surface of the detection part and a surface of the sensor chip can be shortened, so that the distance between the sensing electrodes and the detection electrodes on the surface of the chip is correspondingly shortened, and the measurement hardness and sensitivity are improved.

In FIG. 6, according to another difference, the elastic part 3 is only arranged around the surface of the detection part 4. An area for the sensing electrodes and the surface of the detection part is empty (it can also be considered that air is used as a medium). In this way, the position change range of the sensing electrodes can be enlarged, and the measurement range of the pressure can be enlarged.

In addition, in a scenario where a large object needs to be grabbed, the tactile sensor can be made to be longer by arranging a plurality of sensor chips 42 on the detection base plate 41, so that the detection range can be enlarged.

Figure 7:
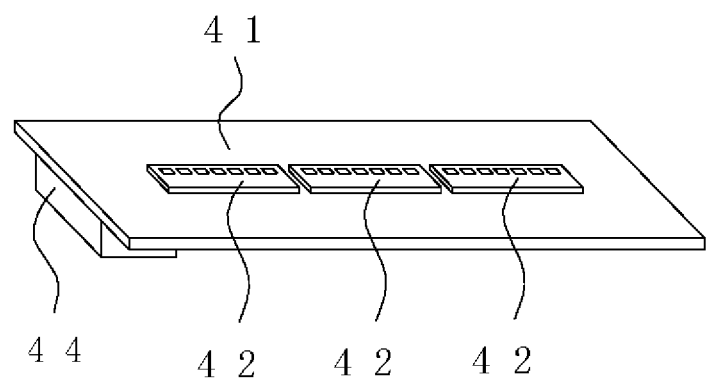
FIG. 7 is a schematic diagram of another sensor chip according to an embodiment of the present invention.

FIG. 7 is a schematic diagram of another sensor chip according to an embodiment of the present invention. As shown in FIG. 7, three sensor chips 42 are arranged on the detection base plate 41, and an electrical interface 44 is also arranged on the detection base plate 41. At this time, the number of the detection electrodes 421 is 108, and the detection range can reach 54.9 mm.

If a larger object needs to be grabbed, a plurality of tactile sensors can be arranged. For example, the tactile sensor shown in FIG. 1 is mounted on a grabbing claw of a mechanical arm at intervals to form a sensing structure for a plurality of contact points.

The serial numbers of the embodiments of the present invention are only for description, and do not represent the quality advantages and disadvantages of the embodiments.

In the above-mentioned embodiments of the present invention, the descriptions of all the embodiments have their own focuses. For parts that are not described in detail in an embodiment, reference may be made to related descriptions of other embodiments.

In the several embodiments provided by the present application, it should be understood that the disclosed technical contents may be implemented in other manners. The apparatus embodiment described above is merely illustrative. For example, the division of units may be a logical function division. In actual implementation, there may be other division methods. For example, multiple units or components may be combined or integrated into another system, or some features can be ignored, or not executed. From another point of view, the mutual coupling or direct coupling or communication connection shown or discussed may be indirect coupling or communication connection through some interfaces, units or modules, and may be in electrical or other forms.

The units described as separate components may or may not be physically separated, and the components displayed as units may or may not be physical units, that is, they may be located in one place, or they may be distributed on multiple units. Part of all of the units may be selected according to actual needs to achieve the objectives of the solutions of the embodiments.

In addition, all functional units in all the embodiments of the present invention can be integrated into one processing unit, or each unit can physically exist alone, or two or more units can be integrated in one unit. The above integrated units can be implemented in the form of hardware, or can be implemented in the form of software functional units.

The integrated unit, if implemented in the form of a software functional unit and sold or used as a standalone product, may be stored in a computer readable storage medium. Based on this understanding, the technical solutions of the present invention essentially or parts that contribute to the existing technology or all or part of the technical solutions can be embodied in the form of a software product, and the computer software product is stored in a storage medium, including several instructions used to cause a computer device (which can be a personal computer, a server, or a network device, etc.) to execute all or part of the steps of the methods in the various embodiments of the present invention. The foregoing storage medium includes: a U disk, a Read-Only Memory (ROM), a Random Access Memory (RAM), a mobile hard disk, a magnetic disk or an optical disk and other media that can store program codes.

The above describes only the preferred embodiments of the present invention. It should be noted that those of ordinary skill in the art can further make several improvements and retouches without departing from the principles of the present invention. These improvements and retouches shall all fall within the protection scope of the present invention.

INDUSTRIAL PRACTICABILITY

The solution provided by the embodiment of the present application can be used for continuously monitoring a grabbing state of a manipulator, adjusting contact points when the manipulator grabs an object, and improving the accuracy of grabbing an object. The technical solution provided by the embodiment of the present application can be applied to various manipulators. A new tactile sensor is provided on the manipulator. Different tactile pressures are used to act on a contact part and an elastic part to enable sensing electrodes in a sensing part to generate different displacements, and different quantities of charges are generated on detection electrodes, thus outputting different sensing signals. The magnitude of contact force and positions of contact points can be calculated according to the magnitudes of the output signals and output waveforms of the signals, so that the following technical problem in the related art is solved: A manipulator adopting a pressure sensor cannot accurately sense contact points of the manipulator and an object, resulting in a significant decrease in accuracy of grabbing an object. The embodiment of the present application can output and feed back sensed pressure to the outside in the form of a sensing signal, thus continuously monitoring a grabbing state of the manipulator; the contact points when the manipulator grabs an object are adjusted to improve the accuracy of grabbing an object.

What is claimed is:

1. A tactile sensor, applied to a manipulator, comprises:
   a contact part, configured to receive pressure transmitted when the manipulator grabs a target object, and transmit the pressure to a sensing part;
   the sensing part, located on one side of the contact part, the sensing part moving along a direction away from the contact part under an action of the pressure, and
   a detection part, located on one side of the sensing part away from the contact part, wherein the detection part generates a sensing signal by means of sensing a change in a position of the sensing part; and the sensing signal is configured to determine a contact parameter between the manipulator and the target object;
   wherein the sensing part comprises: a sensing electrode, and the detection part comprises: a detection base plate; and a sensor chip, located on the detection base plate, wherein the sensing electrode has a projection on the sensor chip; and the sensor chip is electrically connected to the detection base plate through a bonding wire.

2. The tactile sensor as claimed in claim 1, wherein the tactile sensor further comprises:
   an elastic part, located on one side of the contact part, the sensing part being located between the contact part and the elastic part.

3. The tactile sensor as claimed in claim 1, wherein the detection base plate comprises:
   an electrical interface, connected to external equipment and is configured to provide an electrical control signal to the detection base plate and transmit the sensing signal to outside.

4. The tactile sensor as claimed in claim 1, wherein the sensor chip comprises:
   a plurality of detection electrodes, configured to form an electric field together with the sensing electrode, wherein each detection electrode has the same arrangement direction as the sensing electrode.

5. The tactile sensor as claimed in claim 4, wherein the detection electrodes are arranged on the sensor chip.

6. The tactile sensor as claimed in claim 1, wherein the sensor chip further comprises:
   electrical connection electrodes, configured to provide a working voltage and a driving signal to the sensor chip, wherein the driving signal comprises at least one of the following: a clock signal CLK, a row driving signal SI and an output signal SIG.

7. The tactile sensor as claimed in claim 1, wherein the detection part further comprises:
   a frame body, configured to be provided with an accommodating cavity and an opening, the detection base plate and the sensor chip being located in the accommodating cavity; and
   a protection structure, configured to be enclosed with the frame body to form a sealed space.

8. The tactile sensor as claimed in claim 7, wherein the protection structure is one of a protection cover plate and an encapsulation adhesive.

9. The tactile sensor as claimed in claim 8, wherein the contact part is made of a flexible material, and the elastic part is made of a rubber material.

10. The tactile sensor as claimed in claim 8, wherein the detection base plate is mounted inside the frame body, and the protection cover plate is mounted on an upper surface of the frame body and is configured to protect the sensor chip.

11. The tactile sensor as claimed in claim 8, wherein the detection base plate is mounted inside the frame body, and an encapsulation layer is mounted on an upper surface of the frame body and is configured to protect the sensor chip, wherein the encapsulation layer is formed by smearing an encapsulation adhesive.

12. The tactile sensor as claimed in claim 1, wherein the sensing electrode is a flat sheet-like electrode, which is configured to generate a corresponding deformation according to a magnitude of acting force when the target object is in contact with the manipulator.

13. The tactile sensor as claimed in claim 1, wherein the sensing electrode is located between the contact part and the elastic part.

14. The tactile sensor as claimed in claim 13, wherein the sensing electrode carries basic voltage to form an electric field together with a detection electrode which is arranged in the detection part, and charges are formed on the detection electrode, wherein the basic voltage is supplied by the detection part.

15. The tactile sensor as claimed in claim 14, wherein voltage value of the sensing electrode is related to flexibilities and thicknesses of the contact part and the elastic part, initial distance between the sensing electrode and the detection part.

16. The tactile sensor as claimed in claim 1, wherein the sensor chip is a charge sensing sensor chip.

17. The tactile sensor as claimed in claim 1, wherein the sensor chip is provided with a plurality of detection electrodes and electrical connection electrodes which are arranged in parallel.

18. The tactile sensor as claimed in claim 1, wherein the elastic part is arranged around the surface of the detection part, wherein a medium in an area for the sensing electrodes and the surface of the detection part is air.

* * * * *